US008682383B2

(12) United States Patent
Zheng

(10) Patent No.: US 8,682,383 B2
(45) Date of Patent: Mar. 25, 2014

(54) DATA ACCOUNT MANAGEMENT METHOD FOR A MOBILE COMMUNICATION TERMINAL

(75) Inventor: Yu Zheng, Huizhou (CN)

(73) Assignee: Huizhou TCL Mobile Communication Co., Ltd., Huizhou, Guangdong Province (CN)

( * ) Notice: Subject to any disclaimer, the term of this patent is extended or adjusted under 35 U.S.C. 154(b) by 0 days.

(21) Appl. No.: 13/514,598

(22) PCT Filed: Apr. 13, 2011

(86) PCT No.: PCT/CN2011/072752
§ 371 (c)(1),
(2), (4) Date: Jun. 7, 2012

(87) PCT Pub. No.: WO2012/003729
PCT Pub. Date: Jan. 12, 2012

(65) Prior Publication Data
US 2012/0244908 A1    Sep. 27, 2012

(30) Foreign Application Priority Data
Jul. 9, 2010  (CN) .......................... 2010 1 0223638

(51) Int. Cl.
*H04B 1/10*    (2006.01)
(52) U.S. Cl.
USPC ....................... 455/550.1; 455/558

(58) Field of Classification Search
USPC ........... 455/411, 418, 419, 420, 550.1, 552.1, 455/558, 575.1
See application file for complete search history.

(56) References Cited

U.S. PATENT DOCUMENTS

| 2010/0317403 | A1* | 12/2010 | Mizuo ........................... 455/558 |
| 2011/0003590 | A1* | 1/2011 | Yoon et al. .................... 455/558 |
| 2011/0151836 | A1* | 6/2011 | Dadu et al. .................... 455/411 |

FOREIGN PATENT DOCUMENTS

| CN | 101296443 A | 10/2008 |
| CN | 101553055 A | 10/2009 |
| CN | 101895905 A | 11/2010 |

* cited by examiner

*Primary Examiner* — Thanh Le
(74) *Attorney, Agent, or Firm* — Cheng-Ju Chiang

(57) ABSTRACT

The present disclosure is suitable for use in a mobile communication terminal, and provides a data account management method for a mobile communication terminal. The method comprises the following steps of: a. choosing one of SIM (subscriber identity module) cards of the mobile communication terminal when an application of the mobile communication terminal needs to use a data account; b. searching for a corresponding data account group of the SIM card, and choosing data accounts, which are stored in the data account group, in sequence according to priority orders of the data accounts; and c. activating the data accounts that are chosen.

8 Claims, 1 Drawing Sheet

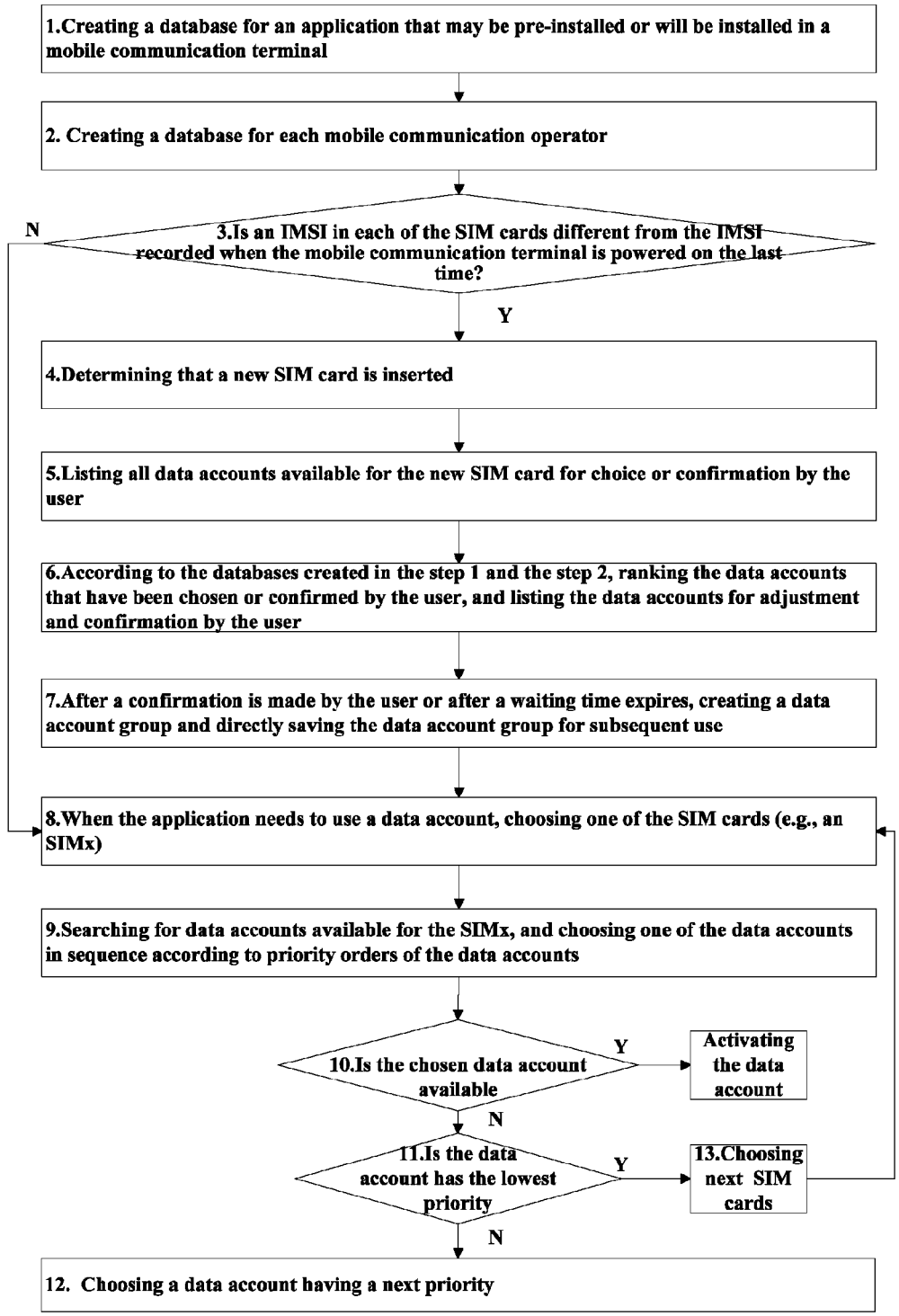

DATA ACCOUNT MANAGEMENT METHOD FOR A MOBILE COMMUNICATION TERMINAL

CROSS REFERENCE TO RELATED APPLICATIONS

The present application is a 35 U.S.C §371 National Phase conversion of International (PCT) Patent Application No. PCT/CN2011/072752, filed on Apr. 13, 2011, the disclosure of which is incorporated by reference herein. The PCT International Patent Application was published in Chinese.

FIELD OF THE INVENTION

The present disclosure generally relates to the technical field of mobile communication, and more particularly, to a data account management method for a mobile communication terminal.

BACKGROUND OF THE INVENTION

With advancement of the mobile communication technologies, some mobile communication terminals have now been able to support a dual-card dual-standby function. That is to say, a user can use two SIM (Subscriber Identity Module) cards simultaneously in a same mobile communication terminal.

Additionally, the WIFI function and the wireless local area network (WLAN) technologies including the Wireless LAN Authentication and Privacy Infrastructure (WAPI) have also become trends of development for the mobile communication terminals.

A "data account" in the mobile communication field is also called an access point name (APN). Currently, a problem with the data account management in the mobile communication terminals is that: technically, a data account is only a series of character strings, and the name and contents thereof cannot be associated with an SIM card intuitively, let alone with the WIFI. Therefore, the mobile communication terminals currently available cannot make management on data accounts effectively.

Accordingly, there is a need in the art for a technical solution that can make management on data accounts effectively.

SUMMARY OF THE INVENTION

An objective of the present disclosure is to provide a data account management method for a mobile communication terminal, which allows the mobile communication terminal to manage data accounts automatically.

To achieve the aforesaid objective, the present disclosure provides a data account management method for a mobile communication terminal, which includes the following steps of:

a. choosing one of SIM cards of the mobile communication terminal when an application of the mobile communication terminal needs to use a data account;

b. searching for a corresponding data account group of the SIM card, and choosing data accounts, which are stored in the data account group, in sequence according to priority orders of the data accounts; and c. activating the data accounts that are chosen.

Preferably, the method further includes the following steps before the step a:

a01. creating a database for each mobile communication operator of the mobile communication terminal respectively, the database comprising names and priority orders of data accounts corresponding to the respective mobile communication operator; and a02. when a new SIM card is inserted in the mobile communication terminal, determining an available data account of the new SIM card and a priority order of the available data account according to the database and creating the data account group.

Preferably, the step a02 includes: when a new SIM card is inserted in the mobile communication terminal, listing the data accounts corresponding to the respective mobile communication operator according to the database for choice by a user; and creating the data account group according to the choice of the user and the priority orders of the data accounts in the database.

Preferably, the step a includes:

a1. if only one SIM card is available in the mobile communication terminal when the application of the mobile communication terminal needs to use a data account, then choosing the SIM card directly; and if two or more SIM cards are available in the mobile communication terminal when the application of the mobile communication terminal needs to use a data account, then choosing one of the two or more SIM cards available.

Preferably, choosing one of the two or more SIM cards available in the step a1 includes:

if the two or more SIM cards of the mobile communication terminal have priority orders, then choosing one of the SIM cards according to the priority orders; and if the two or more SIM cards of the mobile communication terminal don't have priority orders, then randomly ranking the two or more SIM cards and choosing one of them.

Preferably, the data accounts include a WIFI account.

Preferably, the step a further includes:

if no SIM card is available in the mobile communication terminal when the application of the mobile communication terminal needs to use a data account, then choosing the WIFI account directly.

Preferably, the step b further includes:

if the data account that is chosen is the WIFI account, then determining whether the application can be carried by a WIFI channel, and if the application can be carried by the WIFI channel, then proceeding to the step c.

Preferably, the step c further includes:

if no data account is available, then choosing another of the two or more SIM cards of the mobile communication terminal and proceeding to the step b.

The present disclosure provides a data account management method for a mobile communication terminal, which can automatically manage accounts of a mobile communication terminal and particularly data accounts of a multi-card multi-standby mobile communication terminal (including the WIFI account). Thereby, the shortcoming of the prior art is overcome.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings:

The FIGURE is a flowchart diagram of an embodiment of the present disclosure.

DETAILED DESCRIPTION OF THE INVENTION

To make the objectives, technical solutions and advantages of the present disclosure clearer, the present disclosure will be further described hereinbelow with reference to the attached drawings and embodiments thereof. It shall be understood that, the embodiments described herein are only intended to illustrate but not to limit the present disclosure.

The data accounts mentioned in the present disclosure include the following two kinds of objects: one is a data combination of the mobile communication field, which includes an access point name (APN) and a corresponding network access user name and password thereof, and an optional name of the data account as well; and the other represents a data communication channel (briefly called a WIFI or a WIFI data channel) of the wireless local area network (WLAN) technologies in an apparatus. For simplicity of description, the WIFI mentioned in the following description represents the WLAN technologies including the WAPI.

In the embodiments of the present disclosure, a mobile communication terminal can acquire data accounts in the following three ways:

the first way is to preset network technical parameters (including data accounts) of a primary mobile communication operator into the mobile communication terminal by the mobile communication terminal manufacturer; the second way is to automatically copy and then save data accounts in an SIM card by the mobile communication terminal; and the third way is to automatically store some data accounts that have been added manually by a user in a previously used data terminal.

The FIGURE is a flowchart diagram of an embodiment of the present disclosure, which includes the following steps:

1. for an application that may be pre-installed or will be installed in the mobile communication terminal, creating a database to store the following information: a. a name of the application; b. whether the WIFI is applicable; and c. an initial priority of the WIFI relative to data channels based on other SIM cards.

2. for each mobile communication operator, creating a database to store the following information: a. information of commonly used data accounts; b. priority orders of the commonly used data accounts; c. a specific application; and d. information about possible combinations and priority orders of the aforesaid data with respect to the mobile communication operator (required depending on regions). These data are optional because the present disclosure also supports the mechanism of manual ranking by a user.

3. when the mobile communication terminal is powered on, determining whether an International Mobile Subscriber Identity (IMSI) in each of the SIM cards is different from the IMSI of the SIM card that is recorded in the terminal when the terminal is powered on the last time; and if the answer is "yes", then proceeding to step 4, and otherwise, proceeding to step 8.

4. determining that a new SIM card is inserted, and proceeding to step 5.

5. listing all data accounts available for the new SIM card. Specifically, if the database described in the step 2 exists, then all of the data accounts available for the SIM card are listed for choice or confirmation by the user; and if the database described in the step 2 does not exist, then all of the data accounts that have already existed in the apparatus are listed for choice or confirmation by the user.

6. according to the databases created in the step 1 and the step 2, ranking the data accounts that have been chosen or confirmed by the user, and listing the data accounts for adjustment and confirmation by the user.

7. after a confirmation is made by the user or after a waiting time expires, creating a data account group and directly saving the data account group for subsequent use.

8. when the application needs to use a data account, choosing one of the SIM cards (e.g., an SIMx).

If the SIM cards have priority orders, then one of the SIM cards is chosen in sequence according to the priority orders of the SIM cards; and if the SIM cards don't have priority orders, then the SIM cards are randomly ranked and then one of the SIM cards is chosen in sequence.

9. searching for data accounts available for the SIMx, and choosing one of the data accounts in sequence according to priority orders of the data accounts.

10. determining whether the data account that is chosen is available; and if the answer is "yes", then activating the data account, and otherwise, proceeding to step 11.

11. determining whether it is a data account having the lowest priority; and if the answer is "yes", then proceeding to step 13, and otherwise, proceeding to step 12.

12. choosing a data account having a next priority, and proceeding to the step 10.

13. choosing a next one of the SIM cards, and proceeding to the step 8.

The step 10 includes: determining whether the data account is the WIFI account; if the answer is "yes", then determining whether the application can be carried by a WIFI channel. If the application can be carried by the WIFI channel, then the data account can be activated (i.e., the WIFI channel can be created). The detailed process of creating the WIFI channel varies with different software platforms, and includes: checking whether a WIFI module is activated, informing the user whether to activate the WIFI module, activating the WIFI module, searching for an APN, access authentication, service negotiation and so on.

What described above is only preferred embodiments of the present disclosure, but is not intended to limit the present disclosure. Accordingly, any alterations, equivalent replacements and modifications made within the spirits and principle of the present disclosure shall all be covered in the scope of the present disclosure.

What is claimed is:

1. A data account management method for a mobile communication terminal, comprising the following steps of:
   a01. creating a database for each mobile communication operator of the mobile communication terminal respectively, the database comprising names and priority orders of data accounts corresponding to the respective mobile communication operator;
   a02. when a new SIM card is inserted in the mobile communication terminal, determining an available data account of the new SIM card and a priority order of the available data account according to the database and creating the data account group; wherein the step a02 comprises: when a new SIM card is inserted in the mobile communication terminal, listing the data accounts corresponding to the respective mobile communication operator according to the database for choice by a user; and creating the data account group according to the choice of the user and the priority orders of the data accounts in the database;

a. choosing one of SIM (Subscriber Identity Module) cards of the mobile communication terminal when an application of the mobile communication terminal needs to use a data account;
b. searching for a corresponding data account group of the SIM card, and choosing data accounts, which are stored in the data account group, in sequence according to priority orders of the data accounts; and
c. activating the data accounts that are chosen.

2. The method of claim 1, wherein the step a comprises:
a1. if only one SIM card is available in the mobile communication terminal when the application of the mobile communication terminal needs to use a data account, then choosing the SIM card directly; and if two or more SIM cards are available in the mobile communication terminal when the application of the mobile communication terminal needs to use a data account, then choosing one of the two or more SIM cards available.

3. The method of claim 2, wherein choosing one of the two or more SIM cards available in the step a1 comprises:
if the two or more SIM cards of the mobile communication terminal have priority orders, then choosing one of the SIM cards according to the priority orders;
and if the two or more SIM cards of the mobile communication terminal do not have priority orders, then randomly ranking the two or more SIM cards and choosing one of them.

4. The method of claim 1, wherein the data accounts comprise a WIFI account.

5. The method of claim 4, wherein the step a further comprises:
if no SIM card is available in the mobile communication terminal when the application of the mobile communication terminal needs to use a data account, then choosing the WIFI account directly.

6. The method of claim 5, wherein the step b further comprises:
if the data account that is chosen is the WIFI account, then determining whether the application can be carried by a WIFI channel, and if the application can be carried by the WIFI channel, then proceeding to the step c.

7. The method of claim 1, wherein the step c further comprises:
if no data account is available, then choosing another of the two or more SIM cards of the mobile communication terminal and proceeding to the step b.

8. The method of claim 1, wherein the data account is a data combination of the mobile communication field, which comprises an access point name and a corresponding network access user name and password thereof, and an optional name of the data account as well.

* * * * *